US008041022B1

(12) United States Patent
Andreasen et al.

(10) Patent No.: US 8,041,022 B1
(45) Date of Patent: Oct. 18, 2011

(54) POLICY-BASED CONTROL OF CONTENT INTERCEPT

(75) Inventors: Flemming S. Andreasen, Marlboro, NJ (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 11/715,251

(22) Filed: Mar. 6, 2007

Related U.S. Application Data

(60) Provisional application No. 60/780,176, filed on Mar. 6, 2006.

(51) Int. Cl.
*H04M 7/00* (2006.01)

(52) U.S. Cl. ............ 379/221.1; 379/229; 379/230; 379/219; 370/390; 370/432; 709/224

(58) Field of Classification Search .......... 370/390; 379/219
See application file for complete search history.

(56) References Cited

U.S. PATENT DOCUMENTS

| | | | |
|---|---|---|---|
| 5,602,907 A | 2/1997 | Hata et al. ............ 379/114 |
| 5,822,411 A | 10/1998 | Swale et al. ............ 379/111 |
| 5,828,737 A | 10/1998 | Sawyer ............ 379/114 |
| 5,905,736 A | 5/1999 | Ronen et al. ............ 370/546 |
| 5,909,238 A | 6/1999 | Nagashima et al. ............ 348/3 |
| 5,946,670 A | 8/1999 | Motohashi et al. ............ 705/400 |
| 5,956,391 A | 9/1999 | Melen et al. ............ 379/114 |
| 5,970,477 A | 10/1999 | Roden ............ 705/32 |
| 5,987,498 A | 11/1999 | Athing et al. ............ 709/203 |
| 6,016,509 A | 1/2000 | Dedrick ............ 709/224 |
| 6,035,281 A | 3/2000 | Crosskey et al. ............ 705/14 |
| 6,047,051 A | 4/2000 | Ginzboorg et al. ............ 379/130 |
| 6,070,192 A | 5/2000 | Holt et al. ............ 709/227 |
| 6,075,854 A | 6/2000 | Copley et al. ............ 379/211 |
| 6,131,024 A | 10/2000 | Boltz ............ 455/405 |
| 6,137,791 A | 10/2000 | Frid et al. ............ 370/352 |
| 6,141,684 A | 10/2000 | McDonald et al. ............ 709/222 |
| 6,175,879 B1 | 1/2001 | Shah et al. ............ 709/330 |
| 6,208,977 B1 | 3/2001 | Hernandez et al. ............ 705/34 |
| 6,229,887 B1* | 5/2001 | Albers et al. ............ 379/219 |
| 6,282,573 B1 | 8/2001 | Darago et al. ............ 709/229 |
| 6,295,447 B1 | 9/2001 | Reichelt et al. ............ 455/417 |
| 6,330,562 B1 | 12/2001 | Boden et al. ............ 707/10 |
| 6,332,163 B1 | 12/2001 | Bowman-Amauh ............ 709/231 |
| 6,339,832 B1 | 1/2002 | Bowman-Amauh ............ 714/35 |

(Continued)

FOREIGN PATENT DOCUMENTS

WO  WO 98/26381  12/1997

(Continued)

OTHER PUBLICATIONS

Draft—TR45—PN-3-4732-RV4 (to be published as TIA-835.1-D), 32 pages.

(Continued)

*Primary Examiner* — Curtis Kuntz
*Assistant Examiner* — Phung-Hoang J Nguyen
(74) *Attorney, Agent, or Firm* — Baker Botts L.L.P.

(57) ABSTRACT

In one embodiment, a method includes detecting registration of an endpoint associated with a user on a network. The method further includes accessing a policy profile of the user. The policy profile indicates whether data communicated to or from the user is subject to a lawful intercept. The method further includes notifying a lawful intercept server that the user has registered on the network.

21 Claims, 2 Drawing Sheets

U.S. PATENT DOCUMENTS

| | | |
|---|---|---|
| 6,434,568 B1 | 8/2002 | Bowman-Amauh ...... 707/103 R |
| 6,434,628 B1 | 8/2002 | Bowman-Amauh ............ 714/48 |
| 6,438,594 B1 | 8/2002 | Bowman-Amauh .......... 709/225 |
| 6,442,748 B1 | 8/2002 | Bowman-Amauh .......... 717/108 |
| 6,466,964 B1 | 10/2002 | Leung et al. ................. 709/202 |
| 6,477,580 B1 | 11/2002 | Bowman-Amauh .......... 709/231 |
| 6,477,665 B1 | 11/2002 | Bowman-Amauh ............ 714/39 |
| 6,480,485 B1 | 11/2002 | Kari et al. ..................... 370/352 |
| 6,490,451 B1 | 12/2002 | Denman et al. .............. 455/436 |
| 6,493,547 B1 | 12/2002 | Raith ............................. 455/405 |
| 6,496,850 B1 | 12/2002 | Bowman-Amauh .......... 709/203 |
| 6,502,213 B1 | 12/2002 | Bowman-Amauh ............ 714/49 |
| 6,510,513 B1 | 1/2003 | Danieli .......................... 713/156 |
| 6,529,909 B1 | 3/2003 | Bowman-Amauh ............ 707/10 |
| 6,529,948 B1 | 3/2003 | Bowman-Amauh .......... 709/217 |
| 6,539,396 B1 | 3/2003 | Bowman-Amauh ...... 707/103 R |
| 6,549,949 B1 | 4/2003 | Bowman-Amauh .......... 709/236 |
| 6,550,057 B1 | 4/2003 | Bowman-Amauh .......... 717/126 |
| 6,571,282 B1 | 5/2003 | Bowman-Amauh .......... 709/219 |
| 6,578,068 B1 | 6/2003 | Bowman-Amauh .......... 709/203 |
| 6,601,192 B1 | 7/2003 | Bowman-Amauh ............ 714/38 |
| 6,601,234 B1 | 7/2003 | Bowman-Amauh .......... 717/108 |
| 6,606,660 B1 | 8/2003 | Bowman-Amauh .......... 709/227 |
| 6,611,821 B2 | 8/2003 | Stahl et al. .................... 705/400 |
| 6,615,199 B1 | 9/2003 | Bowman-Amauh ............ 706/50 |
| 6,615,253 B1 | 9/2003 | Bowman-Amauh .......... 709/219 |
| 6,615,263 B2 | 9/2003 | Dulai et al. ................... 709/225 |
| 6,621,820 B1 | 9/2003 | Williams et al. ......... 370/395.31 |
| 6,636,242 B2 | 10/2003 | Bowman-Amauh .......... 715/764 |
| 6,640,238 B1 | 10/2003 | Bowman-Amauh .......... 709/201 |
| 6,640,244 B1 | 10/2003 | Bowman-Amauh .......... 709/207 |
| 6,647,262 B1 | 11/2003 | Demetrescu et al. ......... 455/436 |
| 6,665,537 B1 | 12/2003 | Lioy .............................. 455/435 |
| 6,665,718 B1 | 12/2003 | Chuah et al. .................. 709/225 |
| 6,671,675 B2 | 12/2003 | Iwamura ......................... 705/30 |
| 6,684,243 B1 | 1/2004 | Euget et al. ................... 709/222 |
| 6,684,256 B1 | 1/2004 | Warrier et al. ................ 709/238 |
| 6,708,225 B1 | 3/2004 | Cho et al. ...................... 709/317 |
| 6,714,515 B1 | 3/2004 | Marchand .................... 370/231 |
| 6,715,145 B1 | 3/2004 | Bowman-Amauh .......... 718/101 |
| 6,728,266 B1 | 4/2004 | Sabry et al. ................... 370/468 |
| 6,728,365 B1 | 4/2004 | Li et al. ......................... 379/329 |
| 6,728,884 B1 | 4/2004 | Lim ............................... 713/201 |
| 6,742,015 B1 | 5/2004 | Bowman-Amauh .......... 718/101 |
| 6,742,036 B1 | 5/2004 | Das et al. ...................... 709/226 |
| 6,757,371 B2 | 6/2004 | Kim et al. .................. 379/114.22 |
| 6,760,444 B1 | 7/2004 | Leung ........................... 380/270 |
| 6,768,726 B2 | 7/2004 | Dorenbosch et al. ......... 370/331 |
| 6,769,000 B1 | 7/2004 | Akhtar et al. ............. 707/103 R |
| 6,771,623 B2 | 8/2004 | Ton ............................... 370/331 |
| 6,785,256 B2 | 8/2004 | O'Neill ......................... 370/338 |
| 6,804,518 B2 | 10/2004 | Core et al. ..................... 455/436 |
| 6,826,173 B1 | 11/2004 | Kung et al. ................... 370/352 |
| 6,829,709 B1 | 12/2004 | Acharya et al. .............. 713/160 |
| 6,834,341 B1 | 12/2004 | Bahl et al. ..................... 713/156 |
| 6,839,338 B1 | 1/2005 | Amara et al. ................. 370/338 |
| 6,842,906 B1 | 1/2005 | Bowman-Amauh .......... 719/330 |
| 6,856,676 B1 | 2/2005 | Pirot et al. ................. 379/201.01 |
| 6,889,321 B1 | 5/2005 | Kung et al. ................... 713/153 |
| 6,907,501 B2 | 6/2005 | Tariq et al. .................... 711/118 |
| 6,910,074 B1 | 6/2005 | Amin et al. ................... 709/227 |
| 6,915,345 B1 | 7/2005 | Tummala et al. ............. 709/225 |
| 6,917,605 B2 | 7/2005 | Kakemizu et al. ........... 370/338 |
| 6,920,503 B1 | 7/2005 | Nanji et al. ................... 709/230 |
| 6,922,404 B1 | 7/2005 | Narayanan et al. ........... 370/338 |
| 6,925,160 B1 | 8/2005 | Stevens et al. ............. 379/121.05 |
| 6,947,401 B2 | 9/2005 | El-Malki et al. ............. 370/331 |
| 6,961,774 B1 | 11/2005 | Shannon et al. .............. 709/227 |
| 6,967,941 B2 | 11/2005 | Roy .............................. 370/338 |
| 6,978,128 B1 | 12/2005 | Raman et al. ................. 455/414 |
| 6,980,802 B2 | 12/2005 | Jung ............................. 455/436 |
| 6,980,962 B1 | 12/2005 | Arganbright et al. ........... 705/26 |
| 6,981,047 B2 | 12/2005 | Hanson et al. ................ 709/227 |
| 6,982,967 B1 | 1/2006 | Leung ........................... 370/328 |
| 6,987,849 B2 * | 1/2006 | Ravishankar ............. 379/221.1 |
| 6,990,337 B2 | 1/2006 | O'Neill et al. ................ 455/422.1 |
| 6,993,333 B2 | 1/2006 | Laroia et al. .................. 455/436 |
| 7,003,294 B2 | 2/2006 | Singhai et al. ............. 455/435.1 |
| 7,020,697 B1 | 3/2006 | Goodman et al. ............ 709/223 |
| 7,024,687 B2 | 4/2006 | Chaudhuri et al. ............... 726/3 |
| 7,028,311 B2 | 4/2006 | Roach et al. .................. 719/328 |
| 7,039,027 B2 | 5/2006 | Bridgelall .................... 370/329 |
| 7,054,268 B1 | 5/2006 | Paranteinen et al. ......... 370/231 |
| 7,079,499 B1 | 7/2006 | Akhtar et al. ................. 370/310 |
| 7,082,301 B2 | 7/2006 | Jagadeesan et al. .......... 455/436 |
| 7,103,359 B1 | 9/2006 | Heinonen et al. ............ 455/436 |
| 7,127,234 B2 | 10/2006 | Ishii .............................. 455/411 |
| 7,130,286 B2 | 10/2006 | Koodli et al. ................. 370/331 |
| 7,133,386 B2 | 11/2006 | Holur et al. ................... 370/331 |
| 7,151,758 B2 | 12/2006 | Kumaki et al. ............... 370/331 |
| 7,151,772 B1 * | 12/2006 | Kalmanek et al. ............ 370/390 |
| 7,154,868 B1 | 12/2006 | Sharma et al. ................ 370/331 |
| 7,161,914 B2 | 1/2007 | Shoaib et al. ................. 370/331 |
| 7,171,555 B1 | 1/2007 | Salowey et al. .............. 713/156 |
| 7,184,418 B1 | 2/2007 | Baba et al. .................... 370/331 |
| 7,187,931 B2 | 3/2007 | Trossen ........................ 455/440 |
| 7,190,793 B2 | 3/2007 | Hsu ............................... 380/270 |
| 7,197,763 B2 | 3/2007 | Hsu ................................... 726/4 |
| 7,212,821 B2 | 5/2007 | Laroia et al. .................. 455/437 |
| 7,230,951 B2 | 6/2007 | Mizell et al. .................. 370/401 |
| 7,233,583 B2 | 6/2007 | Asthana et al. ............... 370/332 |
| 7,251,733 B2 | 7/2007 | Haverinen et al. ............ 713/182 |
| 7,263,371 B2 | 8/2007 | Das et al. .................... 455/456.1 |
| 7,269,727 B1 | 9/2007 | Mukherjee et al. ........... 713/160 |
| 7,272,122 B2 | 9/2007 | Trossen et al. ................ 370/331 |
| 7,272,123 B2 | 9/2007 | Wall ............................. 370/331 |
| 7,275,156 B2 | 9/2007 | Balfanz et al. ................ 713/168 |
| 7,389,106 B2 | 6/2008 | Dawson et al. .............. 455/406 |
| 2001/0023428 A1 | 9/2001 | Miyazaki et al. ............. 709/201 |
| 2002/0021681 A1 | 2/2002 | Madour ........................ 370/331 |
| 2002/0023174 A1 | 2/2002 | Garrett et al. ................. 709/245 |
| 2002/0036982 A1 | 3/2002 | Chen ............................ 370/230 |
| 2002/0059114 A1 | 5/2002 | Cockrill et al. .................. 705/27 |
| 2002/0091802 A1 | 7/2002 | Paul et al. ..................... 709/220 |
| 2002/0138601 A1 | 9/2002 | Piponius et al. .............. 709/223 |
| 2002/0151312 A1 | 10/2002 | Bos et al. ...................... 455/452 |
| 2003/0021252 A1 | 1/2003 | Harper et al. ................. 370/338 |
| 2003/0039237 A1 | 2/2003 | Forslow ....................... 370/352 |
| 2003/0154400 A1 | 8/2003 | Pirttimaa et al. .............. 713/201 |
| 2003/0187817 A1 | 10/2003 | Agrawal et al. ................... 707/1 |
| 2003/0217165 A1 | 11/2003 | Buch et al. .................... 709/229 |
| 2004/0114553 A1 | 6/2004 | Jiang et al. .................... 370/328 |
| 2004/0162876 A1 | 8/2004 | Kohavi ......................... 709/203 |
| 2004/0162892 A1 | 8/2004 | Hsu ............................... 709/221 |
| 2004/0196821 A1 | 10/2004 | Haddad et al. ................ 370/349 |
| 2004/0203573 A1 | 10/2004 | Chin et al. |
| 2004/0210524 A1 | 10/2004 | Benenati et al. ................. 705/40 |
| 2004/0259562 A1 | 12/2004 | Madour ..................... 455/452.2 |
| 2005/0002407 A1 | 1/2005 | Shaheen et al. .............. 370/401 |
| 2005/0025132 A1 | 2/2005 | Harper et al. ................. 370/352 |
| 2005/0076117 A1 * | 4/2005 | Hou et al. ..................... 709/224 |
| 2005/0130659 A1 | 6/2005 | Grech et al. .................. 455/436 |
| 2005/0149651 A1 | 7/2005 | Doak et al. ..................... 710/52 |
| 2005/0176428 A1 | 8/2005 | Gabor et al. ............... 455/435.1 |
| 2005/0195766 A1 | 9/2005 | Nasieiski et al. ............. 370/331 |
| 2005/0201324 A1 | 9/2005 | Zheng .......................... 370/328 |
| 2005/0213606 A1 | 9/2005 | Huang et al. ................. 370/467 |
| 2005/0220039 A1 | 10/2005 | Hoshino et al. .............. 370/261 |
| 2005/0233727 A1 | 10/2005 | Poikselka et al. |
| 2005/0278420 A1 | 12/2005 | Hartikainen et al. ......... 709/203 |
| 2005/0286709 A1 | 12/2005 | Horton et al. ............. 379/265.09 |
| 2006/0014547 A1 | 1/2006 | Walter ....................... 455/456.1 |
| 2006/0018272 A1 | 1/2006 | Mutikainen et al. .......... 370/328 |
| 2006/0077924 A1 | 4/2006 | Rune ............................ 370/328 |
| 2006/0116113 A1 | 6/2006 | Gass ........................... 455/414.4 |
| 2006/0126630 A1 | 6/2006 | Shirazipour et al. ......... 370/392 |
| 2006/0171310 A1 | 8/2006 | Ahluwalia et al. ........... 370/229 |
| 2006/0251038 A1 | 11/2006 | Tamura et al. ................ 370/342 |
| 2006/0264207 A1 | 11/2006 | Tamura et al. ................ 455/415 |
| 2006/0268819 A1 | 11/2006 | Chen et al. .................... 370/349 |
| 2007/0008882 A1 | 1/2007 | Oran ............................ 370/229 |
| 2007/0036312 A1 | 2/2007 | Cai et al. ...................... 379/126 |
| 2007/0060097 A1 | 3/2007 | Edge et al. ................. 455/404.1 |
| 2007/0086582 A1 | 4/2007 | Tai et al. .................... 379/114.01 |
| 2007/0094712 A1 | 4/2007 | Gibbs et al. ....................... 726/3 |
| 2007/0121615 A1 | 5/2007 | Weill et al. ................... 370/389 |
| 2007/0121642 A1 | 5/2007 | Battin et al. ............... 370/395.2 |

| | | | | |
|---|---|---|---|---|
| 2007/0121812 | A1* | 5/2007 | Strange et al. | 379/70 |
| 2007/0153720 | A1 | 7/2007 | Baglin et al. | 370/328 |
| 2007/0254661 | A1 | 11/2007 | Chowdhury | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages, Unknown.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps. drawings, filed May 19, 2006.
Yegani et al., "System and Method for Handover of an Access Terminal in a Communication Network," U.S. Appl. No. 11/682,735, 24 pps, 3 pps drawings, filed Mar. 6, 2007.

Yegani et al., "Enforcement of User Level Policies from Visited Networks in a Mobile IP Environment," U.S. Appl. No. 11/682,817, 22 pps, 2 pps drawings, filed Mar. 6, 2007.
Yegani et al, Authentication of Access Terminals in a Cellular Communication Network,: U.S. Appl. No. 11/682,857, 28 pps, 5 pps drawings, filed Mar. 6, 2007.
Andreasen et al., "System and Method of Consolidating Accounting Data for a Communication Session," U.S. Appl. No. 11/714,974, 40 pps, 3 pps drawings, filed Mar. 6, 2007.
Panda et al., "System and Method for Capturing Accounting Data for a Communication Session," U.S. Appl. No. 11/715,018, filed Mar. 6, 2007.
Rosenberg et al., "System and Method for Determining a Network for Processing Applications for a Communication Session," U.S. Appl. No. 11/715,019, 40 pps, 3 pps drawings, filed Mar. 6, 2007.
Rosenberg et al., "Determining a Policy Output for a Communication Session," U.S. Appl. No. 11/715,032, 31 pps, 4 pps drawings, filed Mar. 6, 2007.
Leung et al., "Communicating Packets Using a Home Anchored Bearer Path," U.S. Appl. No. 11/715,033, 33 pps, 4 pps drawings, filed Mar. 6, 2007.
Andreasen et al., "Posture-Based Network Authentication," U.S. Appl. No. 11/715,040, 23 pages, 2 pps drawings, filed Mar. 6, 2007.
Iyer et al., "Access Terminal for Communicating Packets Using a Home Anchored Bearer Path," U.S. Appl. No. 11/715,041, 33 pps, 4 pps drawings, filed Mar. 6, 2007.
Rosenberg et al., "System and Method for Exchanging Policy Information in a Roaming Communications Environment," U.S. Appl. No. 11/715,056, 42 pps, 3 pps drawings, filed Mar. 6, 2007.
Rosenberg et al., "Establishing Facets of a Policy for a Communication Session," U.S. Appl. No. 11/715,065, 32 pps, 4 pps drawings, filed Mar. 6, 2007.
Rosenberg et al., "Performing Deep Packet Inspection for a Communication Session," U.S. Appl. No. 11/715,073, 31 pps, 4 pps drawings, filed Mar. 6, 2007.
Rosenberg et al., "Assigning a Serving- CSCF During Access Authentication," U.S. Appl. No. 11/715,074, 22 pps 2 pps drawings, filed Mar. 6, 2007.
Rosenberg et al., "System and Method for Providing Emergency Services in a Visited Communications Environment," U.S. Appl. No. 11/715,111, 39 pps, 2 pps drawings, filed Mar. 6, 2007.
Panda et al., "Application-Aware Policy Enforcement," U.S. Appl. No. 11/715,187, 28 pps, 2 pps drawings, filed Mar. 6, 2007.
Andreasen et al., "System and Method for Generating a Unified Accounting Record for a Communication Session," U.S. Appl. No. 11/715,210, 46 pps, 3 pps drawings, filed Mar. 6, 2007.
Andreasen et al., "Network-triggered quality of service (QoS) Reservation," U.S. Appl. No. 11/715,250, 21 pps, 2 pps drawings, filed Mar. 6, 2007.
Rosenberg et al., "System and Method for Network Charging Using Policy Peering," U.S. Appl. No. 11/715,256, 43 pps, 3 pps drawings, filed Mar. 6, 2007.
Online Inc., "Apogee Releases Content Usage-Based Billing Product Annotated Title—Software allows content usage-based billing," EContent, vol. 24, No. 5, NDN 173-0356-6509-7, 1 pg., Jul. 2001.
Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.
Karsten Lüttge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDN 174-0590-9051-8, 16 pgs., Jan. 1998.
Business Wire, "Apogee Networks Introduces Industry's First Content Usage-Based Billing Solution for Web Hosters," NDN 219-0281-6988-1, 2 pgs., May 8, 2001.
Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

USPTO, Office Action dated Dec. 1, 2008 for U.S. Appl. No. 11/715,111 in the name of Jonathan D. Rosenberg, 25 pages, Dec. 1, 2008.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages, Nov. 10, 2008.

USPTO, Final Office Action dated Jun. 22, 2009 for U.S. Appl. No. 11/715,111 in the name of Jonathan D. Rosenberg, 11 pages, Jun. 22, 2009.

Baker, F. et al, "Cisco Architecture for Lawful Intercept in IP Networks," *The Internet Society*, Oct. 2004.

USPTO, Office Action dated Dec. 15, 2009 for U.S. Appl. No. 11/715,111 in the name of Jonathan D. Rosenberg, 11 pages, Dec. 15, 2009.

USPTO, Office Action dated Jun. 11, 2010 for U.S. Appl. No. 11/715,111 in the name of Jonathan D. Rosenberg, 10 pages, Jun. 11, 2010.

USPTO, Office Action dated Mar. 7, 2011 for U.S. Appl. No. 11/715,111 in the name of Jonathan D. Rosenberg, 5 pages.

Office Action for U.S. Appl. No. 11/715,111 Jun. 11, 2010.

Office Action for U.S. Appl. No. 11/715,111 Nov. 29, 2010.

Baker, et al., "*Cisco Architecture for Lawful Intercept in IP Networks*", Network Working Group, Request for Comments: 3294, Category: Informational, Oct. 2004.

* cited by examiner

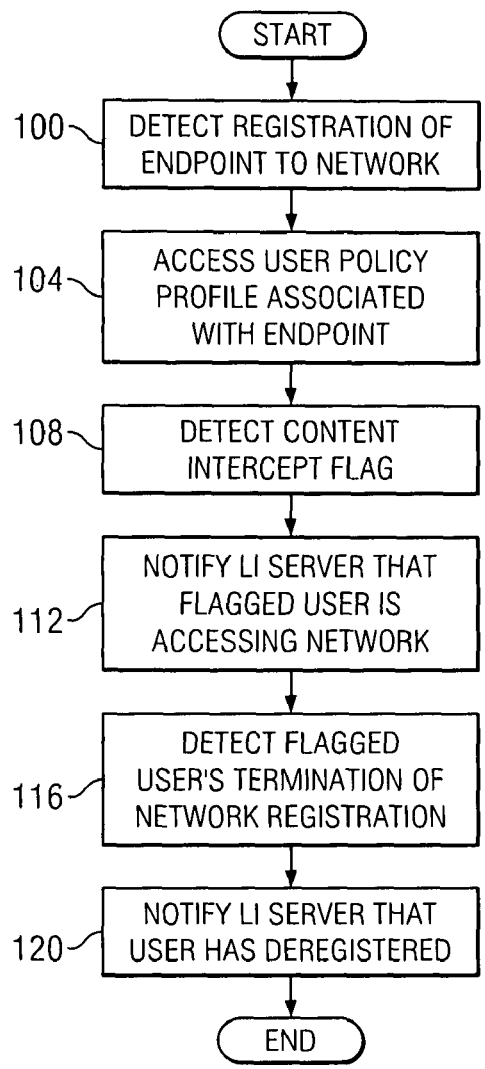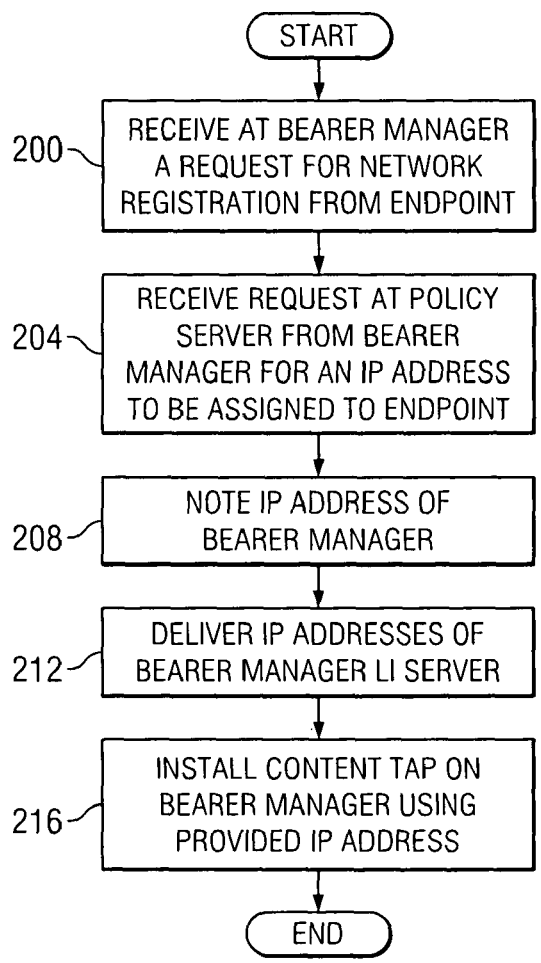

10

POLICY-BASED CONTROL OF CONTENT INTERCEPT

CROSS-REFERENCE TO RELATED APPLICATION

This Application claims the benefit, under 35 U.S.C. §119 (e), of Provisional Patent Application No. 60/780,176 filed Mar. 6, 2006, which is incorporated herein by reference.

TECHNICAL FIELD

The present disclosure relates generally to communication systems.

BACKGROUND

Users of a network may be subject to lawfully authorized electronic surveillance either in the form of data taps, where all data traffic (content) to and from a particular user is to be captured and a copy sent to a law enforcement agency (LEA), or the electronic surveillance may be in the form of a multimedia intercept, where a content intercept for specific IP-flows (5-tuple) needs to be installed dynamically, depending on the type of intercept to be performed.

BRIEF DESCRIPTION OF THE DRAWINGS

FIG. 2 illustrates an example method for policy-based control of content intercept.

FIG. 3 illustrates another example method for policy-based control of content intercept.

DESCRIPTION OF EXAMPLE EMBODIMENTS

Overview

Figure 1:
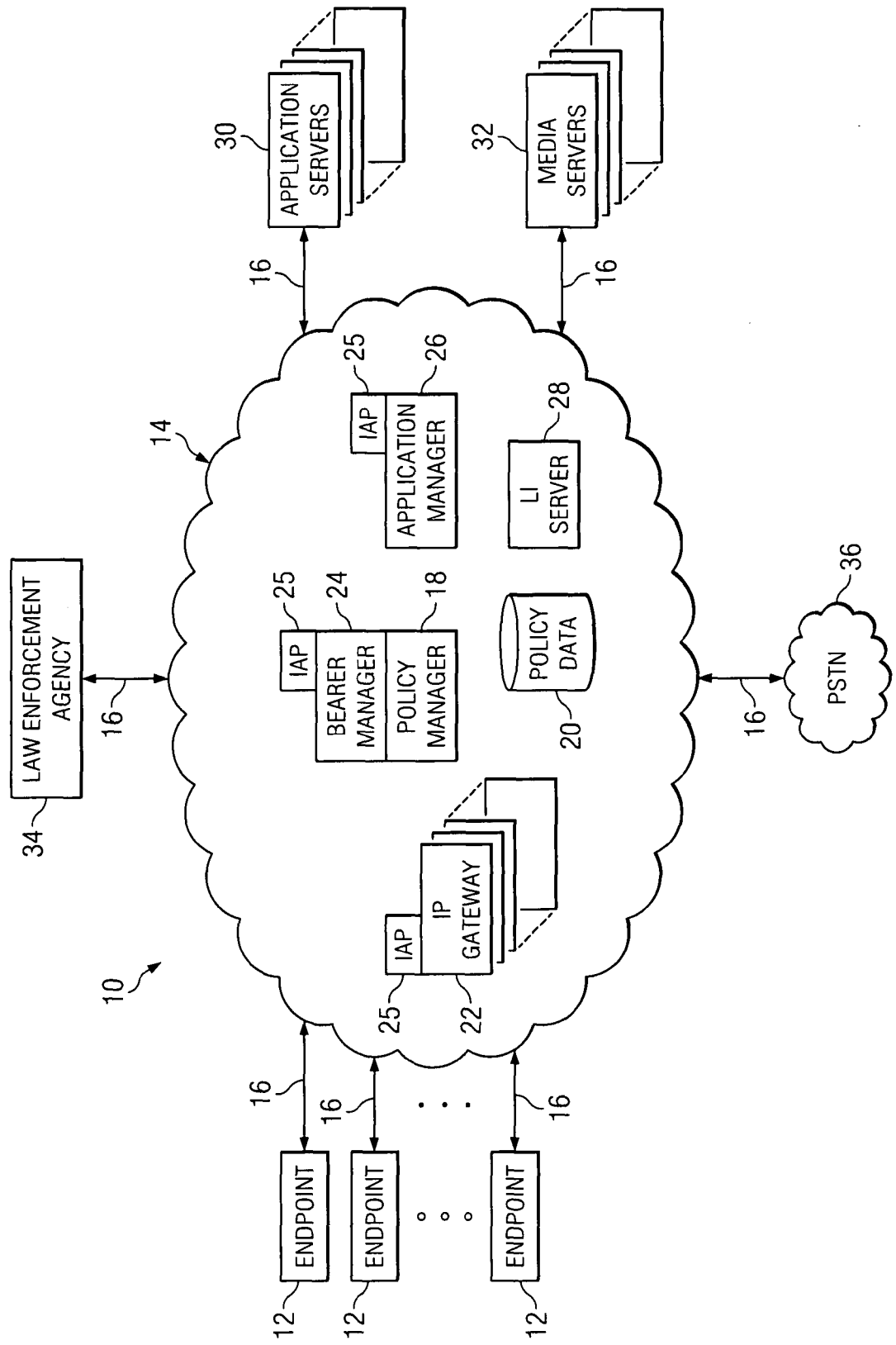
FIG. 1 illustrates an example system for policy-based control of content intercept.

In one embodiment, a method includes detecting registration of an endpoint associated with a user on a network. The method further includes accessing a policy profile of the user. The policy profile indicates whether data communicated to or from the user is subject to a lawful intercept. The method further includes notifying a lawful intercept server that the user has registered on the network.

DESCRIPTION

FIG. 1 illustrates an example system 10 for policy-based control of content intercept. System 10 includes one or more endpoints 12 coupled to a network 14. One or more application servers 30, one or more media servers 32, and the Public Switch Telephone Network (PSTN 36) are also coupled to network 14. Endpoints 12 communicate with each other and with application servers 30, media servers 32, and PSTN 36 via network 14. Communication through network 14 may pass through one or more components coupled to, or contained in, network 14 including, but not limited to, an IP gateway 22, a bearer manager 24, a policy manager 18, an application manager 26, a Lawful Intercept server (LI server 28), and/or a reservoir 20 of policy data. In particular embodiments, network 14 is a local area network (LAN), a wireless LAN (WLAN), a wide area network (WAN), a metropolitan area network (MAN), a portion of the Internet, or another network or a combination of two or more such networks. The present disclosure contemplates any suitable network 14 or combination of networks 14. As an example and not by way of limitation, one or more portions of network 14 may provide a Code Division Multiple Access (CDMA) Evolution Data Optimized (EVDO)—based wireless network infrastructure. One or more portions of network 14 may have a Multimedia Domain Plus (MMD+) or similar system architecture.

One or more links 16 couple an endpoint 12 to network 14. Similarly, one or more links 16 couple one or more application servers 30 to network 14, one or more links 16 couple one or more media servers 32 to network 14, and one or more links 16 couple PSTN 36 to network 14. In particular embodiments, one or more links 16 each include one or more wireline, wireless, or optical links. In particular embodiments, one or more links 16 each include a LAN, a WLAN, a WAN, a MAN, a radio access network (RAN), a portion of the Internet, or another link 16 or a combination of two or more such links 16. As an example and not by way of limitation, a link 16 may include a RAN that has a particular coverage area and provides Layer 2 mobile access, quality of service (QoS), mobility, and handoff services in its particular coverage area. The RAN may include one or more radio resource managers (RRMs) and one or more base terminating stations (BTSs). The present disclosure contemplates any suitable links 16. In particular embodiments, one or more endpoints 12 share with each other one or more portions of one or more links 16 to network 14. As an example and not by way of limitation, a single RAN may couple two or more endpoints 12 (such as, for example, CDMA cellular telephones) to network 14. Similarly, in particular embodiments, one or more application servers 30, media servers 32, or both share with each other one or more portions of one or more links 16 to network 14. In particular embodiments, one or more first links 16 may differ from one or more second links 16. As an example and not by way of limitation, a first link 16 including a RAN may couple one or more endpoints 12 (such as, for example, CDMA cellular telephones) to network 14 and a second link including a PSTN gateway may couple PSTN 36 to network 14. The PSTN gateway may reside wholly or partially in network 14. In particular embodiments, one or more links 16 may each include one or more components that reside in network 14. A link 16 need not necessarily terminate outside network 14. The present disclosure contemplates any suitable arrangements of any suitable links 16 coupling endpoints 12, application servers 30, media servers 32, and PSTN 36 to network 14.

In particular embodiments, an application server 30 provides one or more applications to one or more endpoints 12. As an example and not by way of limitation, an application may include one or more Session Initiation Protocol (SIP)-based communication applications, such as, for example, Internet Protocol (IP) telephony. As another example, an application may include one or more non SIP-based applications, such as, for example, video streaming, gaming, or collaboration. An endpoint 12 may invoke a SIP-based communication application at application server 30 through an application manager 26 in network 14. Application manager 26 may be a hardware, software, or embedded logic component or a combination of two or more such components facilitating integration of the application domain of network 14 into a policy framework and a security infrastructure of network 14. An endpoint 12 or one or more predetermined triggers may invoke a non SIP-based application at application server 30 directly, but policy manager 18 (described below) in network 14 may manage access to the non SIP-based application. Policy manager 18 may also coordinate network resources supporting delivery of the non SIP-based application. In particular embodiments, one or more first application servers 30 provide SIP-based communication applications and one or more second application servers 30 provide non SIP-based communication applications. In particular embodiments, application servers 30 providing SIP-based communication applications reside in network 14 on top of an application manager 26. In particular embodiments, an application server 30 is either stand-alone or user-specific. As an example and not by way of limitation, a stand-alone application server 30 may provide general application services, which users at endpoints 12 may invoke explicitly by reference to the name of their associated services, for example, via a specific SIP uniform resource identifier (URI), a telephone number, or a dial string. Provision of the general application services need not involve originating or terminating call/request treatment. A user-specific application server 30 may provide application services that involve originating or terminating call/request treatment. The present disclosure contemplates any suitable application servers 30 providing any suitable applications to endpoints 12.

In particular embodiments, media servers 32 provide one or more media processing functions to one or more application servers 30. As an example and not by way of limitation, media processing functions may include interactive voice response (IVR), mixing functions, transcoding, announcement functions, messaging functions, and other functions supporting bearer-related services. Media processing functions may be service enablers, e.g., coarse-grained application components that tend to lack utility by themselves, but are useful to other applications. In particular embodiments, one or more media servers 32 are integrated into one or more application servers 30. In particular embodiments, one or more media servers 32 are stand-alone resources relative to one or more applications servers 26 subject to control by typical SIP procedures, such as the use of INVITE messages.

In particular embodiments, an endpoint 12 enables a user at endpoint 12 to communicate with one or more users at one or more other endpoints 12, communicate with one or more users at one or more telephones or other devices across PSTN 36, or both. As an example and not by way of limitation, an endpoint 12 may be a CDMA or other cellular telephone. An endpoint 12 may be a mobile IP telephone. An endpoint 12 may be a dual-mode telephone including both CDMA or other cellular-telephone functionality and mobile IP telephone functionality. An endpoint 12 may be a personal digital assistant (PDA) including CDMA or other cellular-telephone functionality, mobile IP telephone functionality, or both. An endpoint 12 may be a network-enabled media player including CDMA or other cellular-telephone functionality, mobile IP telephone functionality, or both. Reference to media encompasses audio, video, other media, or a combination of two or more such media. An endpoint 12 may be a network-enabled still or video camera. An endpoint 12 may be a notebook computer system, which may run a telephony application such as, for example, SKYPE. An endpoint 12 may include one or more unattended or automated systems (such as for example, video cameras, video monitors, or gateways or other intermediate components) or other devices capable of communicating to or from network 14. Reference to an endpoint 12 encompasses one or more endpoints 12 (also referred to as access terminals), and vice versa, where appropriate. The present disclosure encompasses any suitable endpoints 12.

In particular embodiments, a law enforcement agency (LEA 34) has access to network 14 via a communication link 16. As an example and not by way of limitation, LEA 34 may access network 14 using an endpoint such as a computer system. LEA 34 may be one or more organizations, either affiliated or unaffiliated, with a governmental body. In particular embodiments, LEA 34 may be charged with the task of monitoring data associated with a particular user of network 14. As an example and not by way of limitation, LEA 34 may receive a court order requiring LEA 34 to intercept data associated with the particular user. The court ordered intercept may include, Call Identifying Information (CII), CII and Dialed Digit Extraction (DDE), or Full Intercept. LEA 34 may intercept data using one or more computer resources, endpoints, or other resources coupled to network 14 through communication link 16 or residing in network 14. As an example and not by way of limitation, LEA 34 may use LI server 28 to facilitate interception of data communicated across network 14.

In particular embodiments, network 14 includes an application manager 26, a bearer manager 24, a policy manager 18, one or more IP gateways 22, a reservoir 20 of policy data and a Lawful Intercept server (LI server 28). As described above, in particular embodiments, network 14 also includes a PSTN gateway facilitating communication between network 14 and PSTN 36. In particular embodiments, components of network 14 are distributed across multiple cities or geographical regions. In particular embodiments, components in network 14 use IP, SIP, or both (possibly in addition to one or more other protocols) to communicate with each other. In particular embodiments, components in network 14 use IP, SIP, or both to communicate with endpoints 12, application servers 30, and media servers 32. Reference to IP encompasses any suitable version of IP, such as IPv4, Mobile IPv6, or a combination of the two, where appropriate. Components in network 14 communicate packets to and from each other. As an example and not by way of limitation, a packet communicated from one or more first components in network 14 to one or more second components in network 14 includes bearer data (such as for example, audio data, video data, voice data, other data, or a combination of such bearer data), signaling data, or both. Herein, reference to a packet encompasses a cell, a frame, a datagram, or another unit of data or a combination of two or more such packets, where appropriate.

Policy manager 18 may be responsible for managing policies. Policy manager 18 includes a hardware, software, or embedded logic component or a combination of two or more such components for making policy decisions. In particular embodiments policy manager 18 resides at 2 or more servers in network 14. Herein, where appropriate, reference to a policy encompasses a set of rules for utilizing network resources (such as, for example, QoS-related resources, access and connectivity parameters, mobility resources, accounting resources, deep packet inspection resources, or transcoding or other bearer-specific resources) to support applications run on network 14. In particular embodiments, a rule specifies an action to occur if one or more conditions are satisfied. As an example and not by way of limitation, a request from an endpoint 12 to a bearer manager 24 effectively asking bearer manager 24 for access to network 14 invokes one or more policy processes. Bearer manager 24 may in turn ask policy manager 18 how to allocate network resources at bearer manager 24 for endpoint 12. The question posed by bearer manager 24 to policy manager 18 may take the general form, "User X has asked perform action Y using implementation Z. What network resources should I allocate to user X?" In response to the question from bearer manager 24, policy manager 18 may identify one or more policies associated with endpoint 12 or a user associated with endpoint 12 and make one or more policy decisions concerning how bearer manager 24 or one or more other elements of network 14 should allocate network resources for endpoint 12.

In particular embodiments, every user of network 14 may be associated with a particular user policy profile. A user policy profile may comprise a document or file that defines one or more policies to be associated with one or more users of network 14. The data contained in a user policy profile may include, for example, user-specific policy data used by policy manager 18 to make user-specific policy decisions (e.g., an indication that a particular user's voice traffic should be treated with high priority or a flag on a particular user's profile indicating that LI server 28 should be notified when the particular user accesses network 14), SIP user profile data, (e.g., public SIP identities and/or filter criteria), and Generic SIP User Data, (e.g., buddy lists, watcher authorization rules, and/or transparent SIP application data). In particular embodiments, a user's policy profile may be modified by certain elements of network 14 as circumstances regarding the associated user change. As an example and not by way of limitation, a particular user's policy profile may be modified by LI server 28 to include a flag (hereafter referred to as a content intercept flag) indicating that the particular user's data is subject to lawful intercept.

Policy manager 18 includes a hardware, software, or embedded logic component or a combination of two or more such components for making policy decisions concerning what actions should be taken by network 14 once a particular user attempts to register on, or otherwise access network 14. As an example and not by way of limitation, when a particular user attempts to authenticate to network 14 using an endpoint 12, policy manager 18 will be contacted as part of the authentication process. Policy manager 18 may check one or more policies associated with endpoint 12, as well as a user profile associated with the user of endpoint 12 in order to make one or more policy decisions concerning whether the particular user should be granted access to network 14, and which elements of network 14 should be notified of the particular user's registration on network 14. As a further example and not by way of limitation, when a particular user who has been previously flagged for content intercept attempts to register on network 14 using an endpoint 12, policy manager 18 may check the policies associated with the particular user's policy profile and discover that the user has been flagged for content intercept. Policy manager 18 may then decide to notify LI server 28 that the flagged user is authenticating to the network.

Generally, upon registration of an endpoint 12 to network 14, policy manager 18 may be consulted as part of the authentication process. Policy manager 18, as described above, may gather certain policy data relating to, among other things and not by way of limitation, the endpoint being registered (e.g., the type of endpoint, the services that the endpoint will support, etc.), the user associated with the endpoint (e.g., the billing status of the user, QoS triggers, accounting triggers, the level of network service or connection speed purchased by the user, a maximum amount of bandwidth to be allocated to the user, the presence of a content intercept flag in the user's profile, etc.), and/or the application being invoked by the user (e.g., SIP based, non-SIP based) in order to determine what policies to apply. Accordingly, it is within the scope of the invention for policy manager 18 to view a content intercept flag as merely another policy indication in the profile process.

In particular embodiments, policy manager 18 may check policy profiles associated with particular users of network 14 by accessing a reservoir 20 of policy data containing, among other things, user policy profiles. Reservoir 20 includes a hardware, software, or embedded logic component or a combination of two or more such components for storing policy data related, at least, to the users of the network 14. Reservoir 20 may reside locally on policy manager 18 or may be remotely located as a standalone device, or as an integrated component of another element of network 14. In particular embodiments, reservoir 20 may be a services data manager (SDM) that supports user-specific and non-user specific data (relating to users of network 14) for both SIP and non-SIP applications and services.

In particular embodiments, policy manager 18 may further be capable of recording an address of a particular bearer manager which may be used by LI server 28 as an intercept access point (IAP) 25. As an example and not by way of limitation, bearer manager 24 may contact policy manager 18 on behalf of a particular user who is attempting to register on network 14 using an endpoint 12. Specifically, bearer manager 24 may contact policy manager 18 in order to get an IP-address assigned to the endpoint 12. As described above, policy manager 18 may check the user policy profile associated with the particular user attempting to register on network 14. Upon discovering that the particular user's policy profile contains a content intercept flag, Policy manager 18 may note the address of bearer manger 18 (e.g., the bearer manager servicing the particular endpoint flagged for content intercept). Since bearer manager 18 provides bearer paths to endpoints 12 accessing network 14, bearer manger 18 may be used by LI server 28 as an IAP meaning that LI server 28 may install a content intercept tap on bearer manager 18 to intercept data transmitted to or from endpoint 12. Policy server may further note the IP address(es) assigned to the particular endpoint 12 accessing network 14 through bearer manager 24. Consequently, policy manager 18 may notify LI server 28 of not only the IP address(es) assigned to a particular endpoint 12, but also of the IP address of the associated bearer manager servicing the endpoint. By proactively recording the address of bearer manager 18 during the initial authentication steps, policy manager 18 may eliminate the need for either provisioning this information or requiring LI server 28 (or other server) to perform control point discovery to dynamically determine which bearer manager is servicing a particular IP-address associated with a particular endpoint 12.

In particular embodiments, a user's endpoint 12 may be assigned two IP addresses. The first IP address may be assigned in a visited network, where endpoint 12 is homed on a visited bearer manager (V-BM) in the visited network (or region), by use of a local network mobility management protocol (such as Proxy Mobile IP or Genera Packet Radio Service Tunneling Protocol (GTP)). The second IP address may be assigned in the home network, where endpoint 12 may be homed on a home bearer manager (H-BM) by use of Mobile IP or other mobility protocols (such as GTP) on endpoint 12. The present disclosure contemplates similar functionality being available on bearer managers in either a home network or a visited network.

As an example and not by way of limitation, in the case of a multimedia intercept, policy manager 18 may note the association between an IP address assigned to an endpoint 12 and bearer manager 24 when the particular user registers for an IP address. Policy manager 18 may then inform LI server 28 of the relationship, under the assumption that the user will either place or receive a call and hence, in particular embodiments, LI server 28 need not perform control-point discovery.

In particular embodiments, network 14 include LI server 28. LI server 28 includes a hardware, software, or embedded logic component or a combination of two or more such components for altering user policy profiles, installing content intercept taps, recording data transmitted across network 14, and/or providing intercepted data to LEA 34. LI server 28 may be included in the network 14 for the purposes of meeting lawful intercept requirements; for example, LI server 28 may provide a secure administration interface so that authorized personnel can provision network 14 with one or more lawfully authorized content intercept tap according to a court order.

As an example and not by way of limitation, LI server 28 may be used by LEA 34 to place a content intercept flag into a particular user's policy profile that is stored in reservoir 20. The content intercept flag may carry, among other things, an indication, detectable by policy manager 18, that data associated with the particular user is subject to lawful intercept (the user being hereafter referred to as a "flagged user"). In particular embodiments, the content intercept flag may also include an address of a particular LI server to contact in the event that the flagged user engages in an activity that triggers a lawful intercept of the flagged user's data (e.g., when the flagged registers to network 14 using an endpoint 12). As an example and not by way of limitation, policy manager 18 may detect a content intercept flag in a flagged user's policy profile when the flagged user attempts to access network 14 using endpoint 12. Upon checking the content intercept flag, policy manager 18 may be provided with the address of a particular LI server to contact regarding the flagged user's registration to network 14. Policy manager 18 may then use the address supplied in the content intercept flag to inform the identified LI server that the flagged user is registering to network 14.

In particular embodiments, LI server 28 may be capable of obfuscating a content intercept flag using, for example encryption. A content intercept flag may be visible, or otherwise detectable by various administrative personnel. To render the content intercept flag undetectable, LI server 28 may have the ability to use encryption techniques to hide the content intercept flag.

In particular embodiments, LI server 28 may be capable of installing content intercept taps on various components of network 14 once it has been informed that a flagged user is attempting to access network 14. As an example an not by way of limitation and as discussed above, policy manager 18 may check a flagged user's policy profile when the flagged user registers on network 14. Upon discovering a content intercept flag in the flagged user's policy profile, policy manager 18 may be notified of, among other things, the fact that the flagged user's data is subject to lawful intercept, an address of an LI server to notify (in this case LI server 28), and possibly an instruction to record the address of the bearer manager contacting policy manager 18 to obtain an IP address on behalf of the flagged user's endpoint 12. The policy server may then contact LI server 28 and inform LI server 28 that the flagged user is attempting to access network 14, and furthermore, may provide LI server 28 with the address(es) of both the flagged user's endpoint 12, and the bearer manager servicing the flagged user's endpoint (in this case bearer manager 24). LI server 28 may use this information to install a content tap on bearer manager 24.

A content intercept tap may include a hardware, software, or embedded logic component or a combination of two or more such components for intercepting data that is transmitted across network 14. As an example and not by way of limitation, a content intercept tap may include hardware, software, or embedded logic for intercepting all data traffic (content) to and from a particular endpoint 12, copying the intercepted data, and sending a copy of the intercepted data to LEA 34. In particular embodiments, a content intercept tap may be in the form of multimedia intercept, wherein a content intercept for specific IP-flows (5-tuple) may need to be installed dynamically, depending on the type of intercept to be performed (e.g., CII, CII DDE, or Full Intercept). Thus, the use of content intercepts taps may enable LI server 28 to collect data that is transmitted by a flagged user through network 14 and, in particular embodiments, through other networks connected to network 14, as needed.

In particular embodiments, policy manager 18 may install a content intercept tap on bearer manager 24 without using a separate protocol such as Simple Network Management Protocol version 3 (SNMP(v3)). As an example and not by way of limitation, policy manager 18 may install a content intercept tap on bearer manager 24 using the already existing policy infrastructure, by passing policy information back to bearer manager 24 as part of the policy process during login. The policy information from policy manager 18 may instruct bearer manager 24 to install a content intercept tap, which, in turn, may reduce the overall burden on LI server 28. In particular embodiments, LI server 28 may install content taps on other intercept access points aside from bearer manager 24. As an example and not by way of limitation an IAP 25 may include PSTN gateways, IP gateways, and/or switches in front of voice-mail servers. In particular embodiments, LI server 28 may further be operable to convert intercepted data (e.g. SIP messages to and from a flagged user) into a format such as J-STD-025B, T1.678 in order to comply with the data formatting requirements defined in the Communications Assistance for Law Enforcement Act (CALEA). Furthermore LI server 28 may be further operable to deliver the intercepted data back to LEA 34.

Bearer manager 24 includes a hardware, software, or embedded logic component or a combination of two or more such components for managing bearer paths in network 14. As an example and not by way of limitation, bearer manager 24 may be a particular form of a more generalized edge router such as a cable modem termination system (CMTS) in the context of cable access to network 14 or a broadband remote access server (BRAS) in the case of Digital Subscriber Line (DSL) access to network 14. In particular embodiments, as discussed above, bearer manager 24 may be either a home bearer manager or a visited bearer manager. Generally speaking, managing bearer traffic in network 14 may, as an example and not by way of limitation, include establishing, monitoring, and taking down bearer paths between or among components of system 10. In particular embodiments, bearer manager 24 also facilitates operations such as signal processing, allocating network resources, and managing gateways (such as, for example, IP gateways 22) for endpoints 12. In particular embodiments, bearer manager 24 resides at one or more servers in network 14. In particular embodiments, bearer manager 24 and policy manager 18 coreside with each other at one or more servers in network 14. In particular embodiments, bearer manager 24 includes a Serving General Packet Radio Services (GPRS) Support Node (SGSN), a home/foreign agent, a mobile gateway, a Mobile IPv6 node, a Packet Data Serving Node (PDSN), another component, or a combination of two or more such components. Bearer manager 24 uses any suitable protocol (such as, for example, an IP multimedia subsystem (IMS) protocol) to communicate with one or more other components of system 10.

Since bearer manager 24 manages bearer paths in network 14, policy manager 24 may control functions of bearer manager 24 concerning endpoint access to network 14. As an example and not by way of limitation, bearer manager 24 may contact policy manager 18 on behalf of a particular endpoint 12 that is attempting to access network 14. As discussed above, bearer manager 24 may request policy manager 18 to provide the particular endpoint 12 with an IP address. In particular embodiments, bearer manager 24 contacts policy manager 18 on behalf of an endpoint 12 that is associated with a flagged user. The bearer manager's request for an IP address informs policy manager 18 that the flagged user is registering to network 14. As discussed above, policy manager 18 may then communicate this information to LI server 28 which may then act accordingly (e.g., by installing content intercept taps). Similarly, when the flagged user ends his network session or otherwise deregisters from network 14, bearer manager 24 may inform policy manager 18 accordingly. Policy manager 18 may then communicate this information to LI server 28 which may then act accordingly (e.g., by removing the content taps).

In particular embodiments, access to network 14 is enforced by an IP gateway 22. Consequently, IP gateway 22 may be responsible for authentication of the endpoints 12 to the network 14 which may be accomplished through an Extensible Authentication Protocol (EAP) exchange. IP gateway 22 may perform communications with the RAN, perform handoff functions between itself and the RAN, and facilitate registration of endpoint 12 to the network 14.

Particular embodiments may provide the ability to determine the relevant bearer managers when one or more intervening networks are involved through which control point discovery messages cannot be passed. Particular embodiments may push visited network information to LI server 28 allowing lawful intercept orders to be supported across a collection of service providers.

FIG. 2 illustrates an example method for policy-based control of content intercept. The method begins at step 100, where a bearer manager 24 is contacted by an endpoint 12 that is attempting to register on network 14. As discussed above, upon detecting a request for registration to network 14 from endpoint 12, bearer manager 24 may contact policy server 18 in order to have an IP address assigned to endpoint 12. At step 104, policy server 18 checks the user policy profile of the user associated with endpoint 12 in order to make a policy decision regarding whether and/or how access to network 14 should be provided to endpoint 12. At step 108, policy server 18 detects a content intercept flag in the user's policy profile. At step 112, policy server 18 notifies LI server 28 that a flagged user is accessing network 14. Upon receiving notification that the flagged user is registering to network 14, LI server 28 may install content taps on various IAP's. As discussed above, the address of the LI server may have been provided to policy server 18 by the content intercept flag. At step 116, bearer manager 24 detects a termination of network usage by the flagged user. At step 120 bearer manager notifies policy manager 18 that the flagged user has deregistered from network 14 or has otherwise ceased network activity. Policy manager 18 may then communicate this information to LI server 28, and LI server 28 may remove the content intercept taps on various IAPs, at which point the method ends.

Although particular steps of the method illustrated in FIG. 2 are described and illustrated as occurring in a particular order, the present disclosure contemplates any suitable steps of the method illustrated in FIG. 2 occurring in any suitable order. Moreover, although particular components of FIG. 1 are described and illustrated as executing particular steps of the method illustrated in FIG. 2, the present disclosure contemplates any suitable components executing any suitable steps of the method illustrated in FIG. 2.

FIG. 3 illustrates another example method for policy-based control of content intercept. The method begins at step 200, where a bearer manager 24 receives a request from an endpoint 12 to register to network 14. At step 204, bearer manager 24 contacts policy server 18 to have an IP address assigned to endpoint 12. At step 208, policy manager 18 notes the IP address of bearer manager 24. As discussed above, policy manager 18 may also note the IP address(es) assigned to endpoint 12. At step 212, policy manager 18 communicates the address of bearer manager 24 to LI server 28. As discussed above, policy manager 18 may also deliver the IP address(es) assigned to endpoint 12 to LI server 28. At step 216, LI server 28 install one or more content taps on bearer manager 24 using the IP address provided in step 212, at which point the method ends. Although particular steps of the method illustrated in FIG. 3 are described and illustrated as occurring in a particular order, the present disclosure contemplates any suitable steps of the method illustrated in FIG. 3 occurring in any suitable order. Moreover, although particular components of FIG. 1 are described and illustrated as executing particular steps of the method illustrated in FIG. 3, the present disclosure contemplates any suitable components executing any suitable steps of the method illustrated in FIG. 3.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
   at a policy manager that is centralized with respect to a plurality of gateways to a network, receiving from a bearer manager a request for assignment of a first address to an endpoint that is attempting to register on the network through one of the gateways, the bearer manager having a second address, the one of the gateways that the endpoint is attempting to register on the network through having a third address;
   in response to the request, accessing from the policy manager a policy profile of a user who is associated with the endpoint, the policy profile comprising user-specific policy data specific to the user, a portion of the user-specific policy data indicating whether data communicated to or from the user is subject to a lawful intercept;
   if data communicated to or from the user is subject to a lawful intercept:
   notifying from the policy manager a lawful intercept server that the user is attempting to have the endpoint registered on the network and communicating from the policy manager to the lawful intercept server one or more of the second address or the third address for installation of a content intercept tap at one or more of the bearer manager or the one of the gateways that the endpoint is attempting to register on the network through;
   notifying the lawful intercept server of the first address of the endpoint;
   detecting termination of the registration of the endpoint on the network; and
   notifying the lawful intercept server that the registration of the endpoint on the network has terminated.

2. The method of claim 1, wherein another portion of the user-specific policy data specifies a lawful intercept server for intercepting the data.

3. The method of claim 1, wherein the indication is encrypted to conceal the lawful intercept from unauthorized personnel.

4. The method of claim 1, wherein another portion of the user-specific policy data indicates one or more of:

a maximum amount of bandwidth for utilization by the user;
one or more quality of service (QoS) processing steps applicable to the user; or
one or more accounting steps applicable to the user.

5. The method of claim 1, wherein registration of the endpoint on the network comprises successfully establishing a connection between the endpoint and the network.

6. The method of claim 1, wherein the endpoint comprises a personal digital assistant (PDA).

7. The method of claim 1, wherein the one of the gateways that the endpoint is attempting to register on the network through comprises an edge router.

8. The method of claim 1, wherein the one of the gateways that the endpoint is attempting to register on the network through comprises a Public Switched Telephone Network (PSTN) gateway.

9. The method of claim 1, wherein the one of the gateways that the endpoint is attempting to register on the network through comprises an application manager.

10. The method of claim 1, further comprising using one or more of the second address or the third address to install the content intercept tap.

11. An apparatus comprising:
one or more processors; and
a memory coupled to the processors comprising instructions executable by the processors, the processors operable when executing the instructions to:
at a policy manager that is centralized with respect to a plurality of gateways to a network, receive from a bearer manager a request for assignment of a first address to an endpoint that is attempting to register on the network through one of the gateways, the bearer manager having a second address, the one of the gateways that the endpoint is attempting to register on the network through having a third address;
in response to the request, access from the policy manager a policy profile of a user who is associated with the endpoint, the policy profile comprising user-specific policy data specific to the user, a portion of the user-specific policy data indicating whether data communicated to or from the user is subject to a lawful intercept;
if data communicated to or from the user is subject to a lawful intercept:
notify from the policy manager a lawful intercept server that the user is attempting to have the endpoint registered on the network and communicating from the policy manager to the lawful intercept server one or more of the second address or the third address for installation of a content intercept tap at one or more of the bearer manager or the one of the gateways that the endpoint is attempting to register on the network through;
notify the lawful intercept server of the first address of the endpoint;
detect termination of the registration of the endpoint on the network; and
notify the lawful intercept server that the registration of the endpoint on the network has terminated.

12. The apparatus of claim 11, wherein another portion of the user-specific policy data specifies a lawful intercept server for intercepting the data.

13. The apparatus of claim 11, wherein the processors are further operable when executing the instructions to encrypt the indication to conceal the lawful intercept from unauthorized personnel.

14. The apparatus of claim 11, wherein another portion of the user-specific policy data indicates one or more of:
a maximum amount of bandwidth for utilization by the user;
one or more quality of service (QoS) processing steps applicable to the user; or
one or more accounting steps applicable to the user.

15. The apparatus of claim 11, wherein registration of the endpoint on the network comprises successfully establishing a connection between the endpoint and the network.

16. The apparatus of claim 11, wherein the endpoint comprises a personal digital assistant (PDA).

17. The apparatus of claim 11, wherein the one of the gateways that the endpoint is attempting to register on the network through comprises an edge router.

18. The apparatus of claim 11, wherein the processors are further operable when executing the instructions to use one or more of the second address or the third address to install the content intercept tap.

19. The apparatus of claim 11, wherein the one of the gateways that the endpoint is attempting to register on the network through comprises a Public Switched Telephone Network (PSTN) gateway.

20. The apparatus of claim 11, wherein the one of the gateways that the endpoint is attempting to register on the network through comprises an application manager.

21. A system comprising:
a bearer manager operable to communicate to a policy manager a request for assignment of a first address to an endpoint that is attempting to register on a network through one of a plurality of gateways, the bearer manager having a second address the one of the gateways that the endpoint is attempting to register on the network through having a third address;
the policy manager, being centralized with respect to the gateways and being operable to:
receive the request;
in response to the request, access a policy profile of a user who is associated with the endpoint, the policy profile comprising user-specific policy data specific to the user, a portion of the user-specific policy data indicating whether data communicated to or from the user is subject to a lawful intercept;
if data communicated to or from the user is subject to a lawful intercept:
notify a lawful intercept server that the user is attempting to have the endpoint registered on the network and communicate to the lawful intercept server one or more of the second address or the third address for installation of a content intercept tap at one or more of the bearer manager or the one of the gateways that the endpoint is attempting to register on the network through;
notify the lawful intercept server of the first address of the endpoint;
detect termination of the registration of the endpoint on the network; and
notify the lawful intercept server that the registration of the endpoint on the network has terminated; and
the lawful intercept server, being operable to:
receive the notification and the first and second addresses; and
using one or more of the second address or the third address, install the content intercept tap at one or more of the bearer manager or the one of the gateways that the endpoint is attempting to register on the network through.

* * * * *